Oct. 17, 1944.　　　　H. O. DAY　　　　2,360,654
MOBILE LOADING APPARATUS
Filed Oct. 6, 1943　　　　2 Sheets-Sheet 1
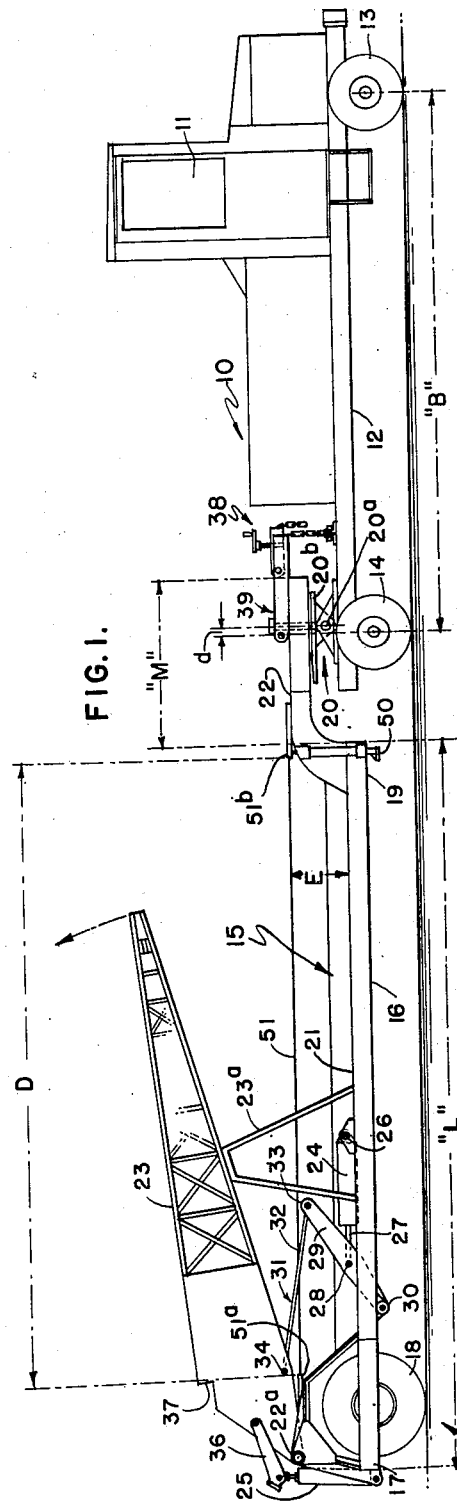
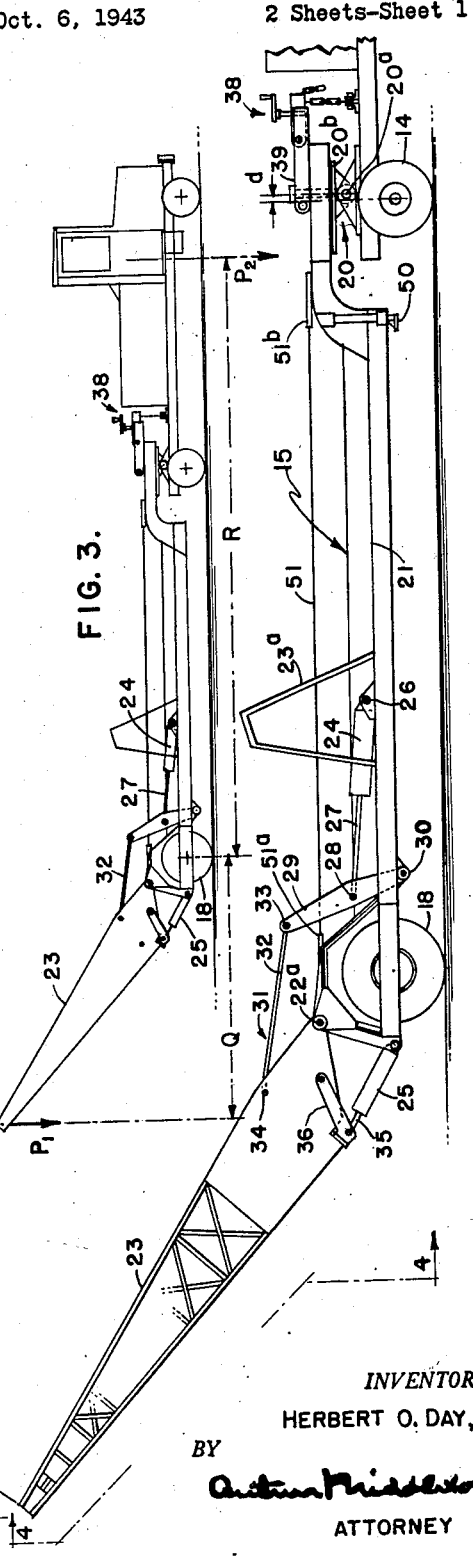
INVENTOR.
HERBERT O. DAY,
BY
ATTORNEY Oct. 17, 1944.   H. O. DAY   2,360,654
MOBILE LOADING APPARATUS
Filed Oct. 6, 1943   2 Sheets-Sheet 2
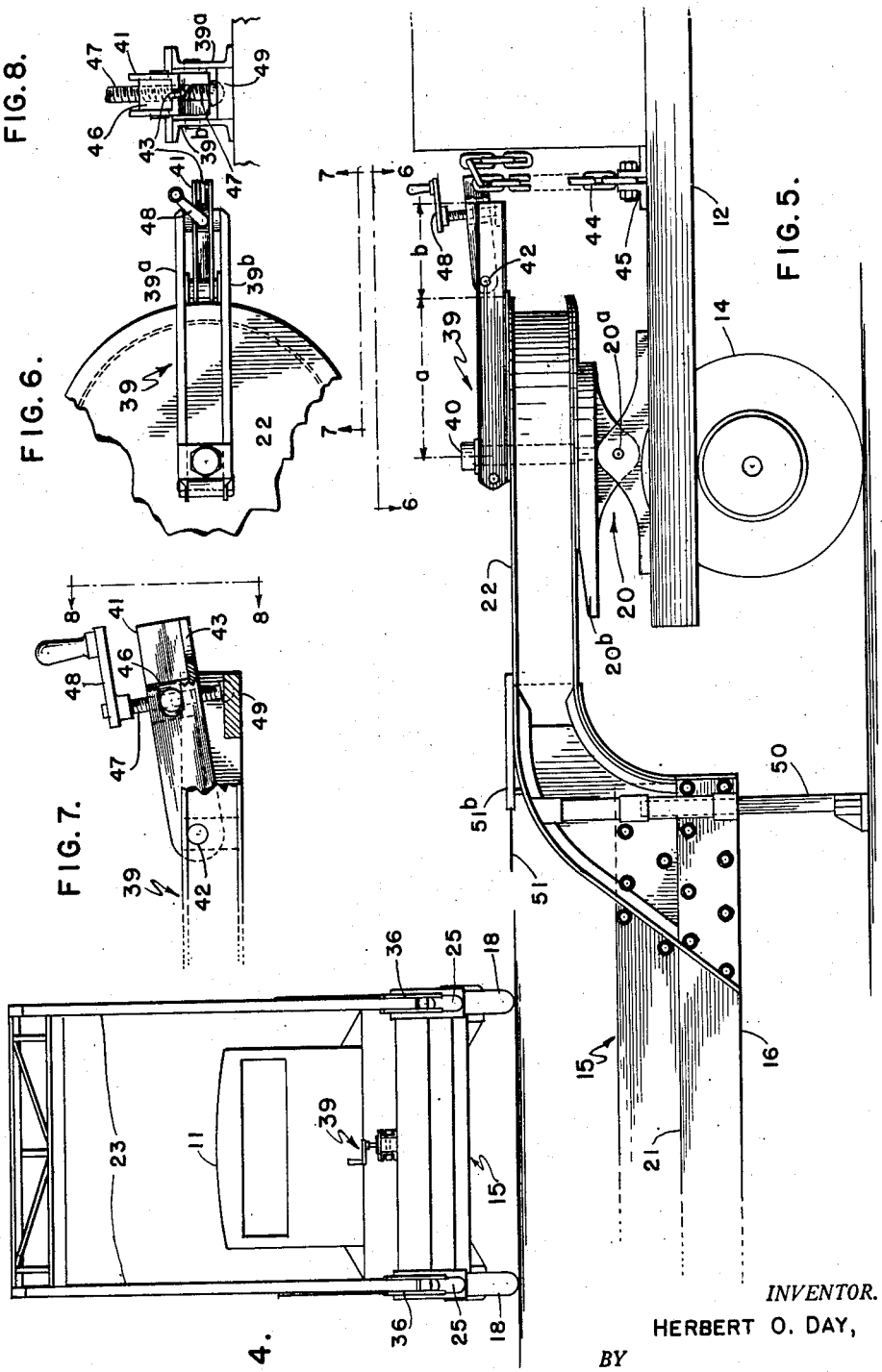
INVENTOR.
HERBERT O. DAY,
BY
ATTORNEY Patented Oct. 17, 1944

2,360,654

UNITED STATES PATENT OFFICE 2,360,654

MOBILE LOADING APPARATUS

Herbert O. Day, Bowling Green, Ohio

Application October 6, 1943, Serial No. 505,154

4 Claims. (Cl. 280—33)

This invention relates to mobile hoisting apparatus in which a swingable loading boom is mounted on a vehicle, and operable to load or unload the vehicle.

This invention grew out of the type of apparatus disclosed in my pending patent application, Ser. No. 488,531 filed May 26, 1943, now Patent No. 2,353,655, dated July 18, 1944, in which a boom is mounted upon the rear end of a truck, and swingable about a horizontal axis which extends transversely of the truck. The boom is in the nature of a frame resembling a portal or inverted U-shape, comprising a pair of swingable posts rigidly interconnected at the top, so that the load can pass through the space between the posts when loading or unloading. By means of suitable actuating mechanism such as I have disclosed in said copending patent application Ser. No. 488,531, the boom is swingable through a wide arc defined by one limit position in which the boom is forwardly inclined over the truck platform, and an opposite limit position in which the boom is rearwardly inclined away from the truck platform. Operable by a special arrangement of hydraulic power cylinders (such as I have disclosed in said patent application), the boom can be swung between these two limit positions, for loading or unloading. It is among the objects of this invention to increase the loading capacity of the above mentioned type of loading apparatus.

This is attained by embodying the invention in a truck-trailer assembly, with the trailer designed more particularly for mounting the boom or hoisting means proper and for convenient and high capacity loading.

More specifically, this trailer is of a desirable length greater than that of a standard truck, and which may accommodate a relatively greater boom than could be mounted directly on a standard type truck, affording greater loading capacity and the ability to handle bulkier loads. But this presents a problem of loading leverages in the sense that the loaded boom in its rearward limit position must be counterbalanced in order to prevent rearward tilting of the vehicle. This invention therefore makes use of the potential combined leverages of the trailer and of the truck. Therefore, it is a feature of this invention to provide means whereby the universal-joint connection or coupling between trailer and truck is immobilized relative to the load effects, so as to realize and render effective a load balancing moment represented by the combined lengths or leverages of the trailer and of the truck and their respective weights.

On embodiment of an immobilizing or stabilizing device comprises an adjustable anchoring or tensioning device effective between the adjoining end portions of the trailer frame and of the truck chassis. The forward end of the trailer frame is mounted and movably supported upon the truck chassis by way of a suitable interposed universal joint connection. The trailer frame has mounted on it cantilever element or beam extending forwardly overlying the truck chassis, and beyond the coupling point, so that the adjustable anchoring- or tensioning device may serve as a vertical connection between the free end of the cantilever element and the associated portion of the truck chassis that lies underneath it. In this way an effective anchoring or counter leverage against the load on the boom can be established.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a side view of the truck-trailer assembly with the loading boom in forward or idle position.

Fig. 2 is a side view of the truck-trailer assembly (the front portion of the truck being broken away) with the loading boom in rearward or cantilevering position.

Fig. 3 is a complete side view in reduced scale of the truck-trailer assembly with the boom in cantilevering rearward position similar to Fig. 2, but more diagrammatic, to illustrate the critical load moments and leverages acting on the assembly.

Fig. 4 is a rear view taken along line 4—4 in Fig. 2.

Fig. 5 is an enlarged detail side view of the immobilizing or anchoring device and the associated end portions of the truck and trailer respectively.

Fig. 6 is a plan view of the immobilizing or anchoring device taken on the line 6—6 in Fig. 5.

Fig. 7 is a side view (with parts broken away) of the device taken on the line 7—7 of Fig. 6.

Fig. 8 is an end view taken on line 8—8 on Fig. 7.

The vehicle assembly in which a special trailer mounting the boom or load hoisting apparatus is coupled to a truck, is somewhat diagrammatically shown in Figures 1, 2, 3. In this assembly a truck 10 for instance of some standard type, includes a cab 11, the chassis or platform 12, front wheels 13, rear wheels 14, and a wheel base "B." A trailer 15 is shown to comprise a low slung frame 16 having its rear end 17 supported by wheels 18, its front end 19 being supported upon the platform 12 of the truck 10 and movably connected thereto by a universal joint or bearing 20 the vertical center line of which is herein shown to be located somewhat ahead of the vertical center line of the rear wheels 14 of the truck, the distance between the two centers being designated as "d."

The universal connection comprises a horizontal turning axis due to the provision of an articulation 20ᵃ, and associated therewith a vertical turning axis due to a turntable construction 20ᵇ.

The trailer 15 has a frame comprising a low-slung loading platform portion 21 of the length L, formed with a stepped-up portion 22 of the length M overlying a corresponding rear end portion of the truck, and operatively connected thereto by the universal bearing or joint 20.

Upon the rear end of the trailer frame is swingably mounted at 22ᵃ a loading boom 23 shown in Fig. 1 to be resting in forward limit or idle position upon a support 23ᵃ, and in Fig. 2 in rearward limit or cantilevering position. To load or unload the boom is moved between these two limit positions by a system of hydraulic power actuating cylinders operated through a pump (not shown) to furnish the hydraulic fluid, which pump in turn is driven from the engine of the truck 10. The principle of operation of the hydraulic operating system for the power cylinders need not here be described, since it is fully shown and described in my aforementioned copending patent application Ser. No. 488,531. Suffice it to say that the cylinders are so arranged and disposed as to impart to the boom simultaneous pushing and pulling forces. That is to say, a forward cylinder 24 and a rearward cylinder 25 act simultaneously to swing the boom, at least during a critical phase of its movement, namely when the load leverage is unfavorable. The wide arc of movement between extreme limit positions of the boom is made possible by the fact that the cylinder 25 is allowed to functionally detach itself from the boom (compare Figs. 2 and 1), after it has helped to move the boom through the initial or critical phase of its load lifting movement from the Fig. 2 to the Fig. 1 limit position.

The forward power cylinder 24 is swingably mounted upon the trailer frame as by pivot 26, and has a piston rod 27 having a pivot connection 28 with the intermediate portion of a lever 29 the lower end of which is mounted for swinging movement as by pivot 30 upon the trailer frame. The upper end of lever 29 has a link connection 31 with the boom 23, as represented by the link rod 32 having one end pivotally connected as at 33 with the lever 29, and the other end pivotally connected as at 34 with the boom 23.

The rearward power cylinder 25 has a piston rod 35 connected with the boom 23 by a link 36. By reason of the link 36 the piston rod 35 can detach itself from a seat 37 on the boom 23 (as in Fig. 1), or engage the same as in Fig. 2.

Fig. 3 represents a load or force diagram showing the boom 23 in extreme rearward or cantilevering position weighted with a load $P_1$ and having a leverage Q with respect to the axle or center of trailer wheels 18. The weights of the truck and of the trailer are assumed to be concentrated in the weight $P_2$ having a leverage R relative to the center of the trailer wheels 18. The mechanical effect of the leverage R is realized according to this invention by neutralizing or, in effect, immobilizing the joint 20 by means of an anchoring or tensioning device 38. In this manner, the moment $P_2 \times R$ is utilized to counterbalance the load moment $P_1 \times Q$ about the axle of wheels 18 as a center, to counteract the tendency of the trailer frame to tilt off the truck about the axle of wheels 18. That is to say, a relatively great and effective moment is thus established to counterbalance the load $P_1$ by utilizing the combined weights and leverages of the trailer and of the truck.

The anchoring and tensioning device 38 comprises an arm or cantilever element 39 composed of two parallel flat component elements 39ᵃ and 39ᵇ suitably interconnected, disposed on top of the stepped-up portion 22 of the trailer frame and anchored thereto as by a bolt 40. This cantilever element 39 thus comprises a supported portion a and a cantilevering portion b. The arm 39 has mounted upon it a secondary arm 41 disposed between the flat elements 39ᵃ and 39ᵇ and swingable thereon about a horizontal pivot 42. The secondary arm 41 is of U-shaped cross section (see Fig. 8) and has at its free end a recess or cutout 43 in which may be anchored a link of a tensioning chain 44 which chain in turn is anchored as at 45 upon the frame of the truck. The secondary arm 41 has provided within it, that is within the space of the U-shape, a block 46 in which is operable a threaded spindle 47 provided with a hand crank 48. The spindle extends downwardly from the block 46 and rests in a socket portion 49 which constitutes part of the free extreme end portion of the cantilever element 39.

At 50 is indicated a vertically adjustable leg or brace such as is usually provided on trailers. A reinforcing cable or bracing element 51 of the length designated by the dimension D extends horizontally from end to end of the trailer frame, being attached thereto at 51ᵃ and 51ᵇ. This reinforcing cable is spaced a distance E above the trailer platform portion 21, in order to absorb transverse bending stresses imposed upon the trailer frame by the load moment $P_1 \times Q$.

Operation

The operation of the boom 23 when loading and unloading is clear in principle from the foregoing description of the apparatus, and the details of its actuating mechanism are fully disclosed and described in the aforementioned copending patent application Ser. No. 488,531.

The operation of the anchoring- or immobilizing device 38 with respect to the truck-trailer assembly is as follows:

When this mobile assembly including the truck 10 and the trailer 16 is in condition for transit, with the boom 23 in idle forward position (as shown in Fig. 1), the anchoring device 38 is ineffective as indicated by the coupling chain 44 being detached from the secondary arm 41. In order to condition the truck-trailer assembly for loading or unloading, a link of the chain 44 is inserted in the cutout 43 of arm 41, whereby the free end of the chain is anchored therein. Then, by turning the crank 48 in the proper direction, the secondary arm is jacked up on the cantilever element 39, until the chain 44 is sufficiently tensioned to substantially prevent motion between the trailer and the truck about the horizontal axis of the articulation 20$^a$ of the universal joint 20, as well as to counteract the tendency of the trailer frame to lift off the truck chassis. Now the boom in its Fig. 1 position can be loaded and the load be swung forwardly over on to the trailer, or vice versa a load from the trailer be swung rearwardly off the trailer.

While I have disclosed a jack screw 47 for immobilizing the articulation 20$^a$, I visualize that such immobilization is also realizable through other means, for instance by a cam and lever construction, or through a hydraulically operated device.

I claim:

1. A coupling device between a truck and a trailer whose front end is supported by the truck, comprising an articulated connection providing pivotal mobility between the truck and the trailer at least about a horizontal axis, and means for optionally locking said articulated connection against motion about said horizontal axis whereby the position of the trailer relative to the truck becomes fixed with respect to said axis when the truck is not in motion.

2. A coupling device for a truck-trailer assembly, in which the front end portion of the trailer overlies the rear end of the truck, said coupling device comprising an articulated connection providing pivotal mobility between the truck and the trailer at least about a horizontal axis, and stabilizing means for optionally immobilizing said articulated connection against rearward tilting of the trailer, said stabilizing means comprising a cantilever element extending horizontally from the front end portion of the trailer frame forwardly beyond said connection, and releasable anchoring means effective between said cantilever element and the truck.

3. A coupling device according to claim 2, in which said releasable anchoring means comprises an anchoring element, and jack screw means associated with said cantilever element for adjusting the tension of said anchoring element.

4. A coupling device according to claim 2, in which said releasable anchoring means comprises an arm pivotally mounted upon said cantilever element for vertical swinging movement, a substantially vertically extending anchoring element connecting said arm with a portion of the truck underneath, and jack screw means for moving said arm relative to the cantilever element, so as to adjust the tension of said anchoring element.

HERBERT O. DAY.